Sept. 1, 1953 — C. W. CHENEY — 2,650,406
WORM GEARED BAND CLIP
Filed June 7, 1952

CHARLES WILLIAM CHENEY
INVENTOR

BY Richardson David and Nordon
his ATTORNEYS.

Patented Sept. 1, 1953

2,650,406

UNITED STATES PATENT OFFICE 2,650,406

WORM GEARED BAND CLIP

Charles William Cheney, Hockley,
Birmingham, England

Application June 7, 1952, Serial No. 292,342
In Great Britain March 28, 1950

2 Claims. (Cl. 24—274)

The invention relates to a worm-geared band clip of the kind described and illustrated in United States Patent No. 2,477,045 dated the 26th July, 1949.

In all band clips of the circular band kind to which the invention solely relates, the closing stresses cause the worm to rock in the housing from the thread and teeth engagement and to thereby cause "dip" or depression of the head end of the worm and consequent insufficient thread and tooth engagement, resulting in fracture of either, or slip of band-closing grip on an article.

In my U. S. A. application Serial Number 217,215 filed on the 23rd March, 1951 is described and illustrated a construction of such a clip in which "dip" of the head end of the worm automatically forces a flat and solid base of a head end band-tensioning washer downwardly against the supported toothed end of the band with a frictional pressure equal, substantially, to the band closing stresses operating for grip and without any teeth engagement by said washer.

The present invention provides a special construction of closed-on neck-washer characterised by a solid crown portion adapted to extend throughout the whole of the arch shaping of the housing, and a divided and flat base flange adapted to press against the toothed end of the band without tooth engagement when the head end of the worm "dips" consequent upon tensionally closing the clip upon an article.

A band clip comprising a combination of parts hereinafter claimed is illustrated by the accompanying drawings, wherein—

Figure 1:
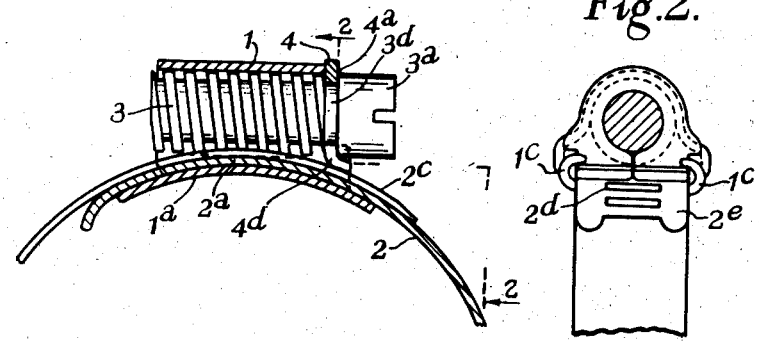
Fig. 1 is a side elevation partly in section.

With reference to the drawings, 1 is a tubular rigid worm housing open at both ends, 2a is the plain end of the band 2 fixed within the laterally enlarged base 1a of the housing 1, and 2c is the toothed end portion of the band 2 adapted to be drawn through the housing 1 by the worm 3 while lying over the housing end of the band 2 and is guided by the sides of the laterally enlarged base 1a of the housing 1.

The teeth 2d are formed intermediate uniformly spaced depressions in the surface of the band and are flush with its face 2e. The one end of the housing is provided with base projections 1c.

The worm 3 has a head end 3a of the same diameter as the external diameter of the worm threads and between the head end and the worm threads there is formed a circular neck portion 3d of reduced diameter about which a radially movable abutment washer 4 is closed for movement up and down with the head end 3a of the worm 3 while permitting the neck 3d to revolve freely in the washer.

The washer 4 is interposed between the head portion 3a and the housing 1 to transmit the longitudinal band closing stresses from the worm 3 to said housing, and also by lateral engagement between washer 4 and neck portion 3d, to cause its divided and flat flange-base 4d to press forcibly against the toothed end of the band to create frictional resistance between the washer and the toothed end 2c of the band 2 accompanying "dip" or radial inward movement of the head end of the worm when the clip is tensioned around a hose tube or the like.

Figure 2:
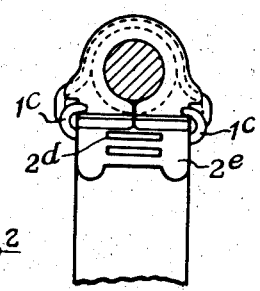
Fig. 2 is a transverse sectional view taken along the line 2—2 of Fig. 1, looking in the direction of the arrows.
Figure 3:
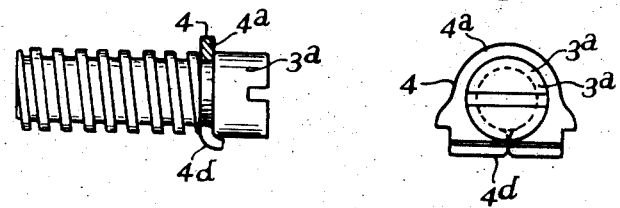
Fig. 3 is a side elevational view of a worm member with an abutment washer mounted on the neck portion thereof, the abutment washer being shown partly in section.

The washer 4 has a solid crown portion 4a to extend throughout the whole of the arch-shape of the housing and a divided and flat base-flange 4d to press against the toothed end of the band as clearly shown by Figs. 1 and 2 without any engagement of said washer with the teeth of the band so that the washer will function mechanically both for axial stresses and worm-head "dip."

In operation, the worm 3 is turned in a clockwise direction as viewed in Fig. 2, to effect tightening of the clip. The helical thread of the worm 3 engages a few of the teeth formed in the outer surface of the toothed end portion 2c of the circular band 2. As viewed in Fig. 1, during tightening of the clip, the free toothed end of the circular band member 2 is drawn toward the right, producing a force of reaction acting to the left along the lower edges of the helical threads of the worm 3. This force of reaction causes a turning moment tending to rotate or tilt the longitudinal axis of the worm 3 in a clockwise direction as viewed in Fig. 1. Since the left end of worm 3 cannot move upwardly, being restrained by the crown of the housing 1, the right end with its head portion 3a tends to move downwardly, or radially inwardly, causing a corresponding radial inward movement of washer 4 which encircles the neck portion 3d of the worm and is laterally engaged thereby. This forces the base 4d of the washer 4 into frictional engagement with the outer surface of the toothed end portion 2c of circular band member 2, interfering engagement with the teeth 2d being prevented by the fact that they are flush with the outer surface of the band member 2.

Figure 4:
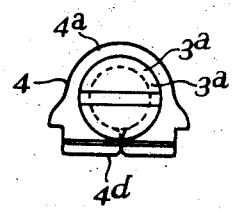
Fig. 4 is an end view of the worm and washer shown in Fig. 3.
Figure 5:
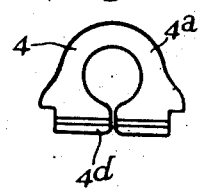
Fig. 5 is an end view, similar to Fig. 4, showing the abutment washer in closed condition.

The base 4d of washer 4 is divided to permit the washer to be assembled on the neck portion 3d of the worm 3 with the divided base 4d opened, the washer then being forced closed as shown in Fig. 5 so that it freely revolubly encircles the neck portion 3d of the worm 3 as shown in Fig. 4.

I claim:

1. A band clip of the class described, comprising: a circular band member having uniformly spaced depressions formed therein to provide teeth on an external surface adjacent to one end portion thereof; and open ended tubular housing mounted on the other end portion of said band member and spaced therefrom to permit passage of said end portion therebetween; a worm member rotatably and tiltably mounted in said housing for engagement with said teeth, said worm member having a head portion external to said housing and a neck portion of reduced diameter external to said housing and adjacent to said head portion; and a radially movable abutment washer mounted on and laterally engaging said neck portion said washer being interposed between said housing and said head portion and having a divided base engageable with said toothed end portion while providing clearance for said teeth, whereby said divided base, when opened, permits said washer to be assembled on and closed around said neck portion, and whereby tightening of said clip by turning of said worm forces said base into frictional engagement with said toothed end portion by radial movement of said washer, said radial movement being caused, at least in part, by tilting of said worm.

2. A band clip according to claim 1, wherein said housing is formed with a laterally enlarged base portion which guides said toothed end portion of said circular band member.

CHARLES WILLIAM CHENEY.

References Cited in the file of this patent

UNITED STATES PATENTS

| Number | Name | Date |
|---|---|---|
| 2,384,094 | Jamie | Sept. 4, 1945 |
| 2,487,296 | Bergstrom | Nov. 8, 1949 |

FOREIGN PATENTS

| Number | Country | Date |
|---|---|---|
| 914,467 | France | June 17, 1946 |